United States Patent
Tarbotton et al.

(10) Patent No.: US 7,266,843 B2
(45) Date of Patent: Sep. 4, 2007

(54) MALWARE SCANNING TO CREATE CLEAN STORAGE LOCATIONS

(75) Inventors: Lee Codel Lawson Tarbotton, Leicester (GB); James Malcolm Vignoles, Aylesbury (GB); Christopher Andrew Barton, Buckingham (GB)

(73) Assignee: McAfee, Inc., Santa Clara, CA (US)

( * ) Notice: Subject to any disclaimer, the term of this patent is extended or adjusted under 35 U.S.C. 154(b) by 951 days.

(21) Appl. No.: 10/025,572

(22) Filed: Dec. 26, 2001

(65) Prior Publication Data
US 2003/0120952 A1 Jun. 26, 2003

(51) Int. Cl.
*G06F 21/02* (2006.01)
*G06F 21/00* (2006.01)
*G06F 21/22* (2006.01)
*G06F 21/04* (2006.01)

(52) U.S. Cl. .................. 726/22; 726/23; 726/24; 726/27; 713/188; 713/189; 713/193; 713/194; 705/51; 705/52; 714/38

(58) Field of Classification Search .............. 726/24; 713/188
See application file for complete search history.

(56) References Cited

U.S. PATENT DOCUMENTS

| | | | | |
|---|---|---|---|---|
| 5,502,815 A | * | 3/1996 | Cozza | .......... 726/24 |
| 5,613,002 A | | 3/1997 | Kephart et al. | |
| 5,684,875 A | * | 11/1997 | Ellenberger | .......... 482/4 |
| 6,021,510 A | * | 2/2000 | Nachenberg | .......... 714/38 |
| 6,073,239 A | * | 6/2000 | Dotan | .......... 726/24 |
| 6,266,774 B1 | * | 7/2001 | Sampath et al. | .......... 726/24 |
| 6,735,700 B1 | * | 5/2004 | Flint et al. | .......... 726/24 |
| 6,763,466 B1 | * | 7/2004 | Glover | .......... 726/24 |
| 6,772,346 B1 | * | 8/2004 | Chess et al. | .......... 716/13 |
| 6,892,303 B2 | * | 5/2005 | Le Pennec et al. | .......... 713/188 |
| 6,938,161 B2 | * | 8/2005 | Vignoles et al. | .......... 713/188 |
| 7,155,461 B2 | * | 12/2006 | Miyata et al. | .......... 707/200 |
| 2002/0016925 A1 | * | 2/2002 | Pennec et al. | .......... 713/201 |
| 2002/0103783 A1 | * | 8/2002 | Muhlestein | .......... 707/1 |

OTHER PUBLICATIONS

W.T. Polk, L.E. Bassham. "A Guide to the Selection of Anti-Virus Tools and Techniques" Dec. 2, 1992. NIST Computer Security Division.*

Bontchev, Vesselin. Possible Virus Attacks Against Integrity Programs and How to Prevent Them, Proc. 2nd Int. Virus Bull. Conf., 1992, pp. 131-141.*

G.H. Kim, E.H. Spafford. "The Design and Implementation of Tripwire: A File System Integrity Checker". 1994, ACM.*

(Continued)

*Primary Examiner*—Syed A. Zia
(74) *Attorney, Agent, or Firm*—Zilka-Kotab, PC; Christopher J. Hamaty

(57) ABSTRACT

Pre-emptive malware scanning of user specified operating system 10, 12 defined storage locations is performed to establish whether those storage locations contain any malware containing computer files. If the storage locations are malware-free, then they are classified as clean storage locations and subsequent read accesses to those storage locations will be permitted without requiring further malware scanning. Writes to clean storage locations will continue to be malware scanned.

19 Claims, 4 Drawing Sheets

OTHER PUBLICATIONS

Jones, Dave. "Building an E-mail Virus Detection System for Your Network". Dec. 2001, Linux Journal.*

Cohen, Fred. "Current Best Pratice Against Computer Viruses" Oct. 1991. Security Technology. Proceedings. 25th Annual 1991 IEEE International Carnahan Conference.*

Symantec.com. "Norton AntiVirus 2001 for Windows 2000/NT/Me/98/95." Oct. 27, 2000. Archived page provided by archive.org : http://web.archive.org/web/20001109035700/www.symantec.com/nav/nav_9xnt/.*

Green et al. "Vesseling Bontchev's Paper 'Vircing The invircible' [long] (pc)" Sep. 5, 1996. usenet:comp.virus. Post of interest dated Sep. 6, 1996 by Bill Lambdin.*

Probert, Matthew. "Timid" Mar. 28, 1998. usenet:alt.comp.virus.source.code.*

Hruska, Jan "Virus Detection" European Conference on Security and Detection, Apr. 28-30, 1997, Conference Publication No. 437 p. 128-131. IEE.*

Colorade, Dave et al. "How to Exclude Folders from NAV Virus Scanning?" (Apr. 4, 2001 3:23pm) usenet:alt.sci.seti.*

P. Faltstrom, D. Crocker, E.E. Flair "RFC 1740: MIME Encapsulation of Macintosh file—MacMIME" (Dec. 1994).*

C. Davidson et al. "UNIX Anti-Virus Software" (Jul. 21, 1997). usenet:comp.security.unix Post 4 dated Jul. 23, 1997.*

A. Hideharu et al, "Method for Preventing Intrusion of Computer Virus" *Patent Abstracts of Japan* No. 09231067A, 1997.

Trend Micro, Inc., "Eliminating Viruses in the Microsoft Exchange Environment with Trend ScanMail for Exchange" 1999.

* cited by examiner

MALWARE SCANNING TO CREATE CLEAN STORAGE LOCATIONS

BACKGROUND OF THE INVENTION

1. Field of the Invention

This invention relates to data processing systems. More particularly, this invention relates to malware scanning, such as, for example, scanning for computer viruses, worms, Trojans, banned files, banned words etc, within computer files.

2. Description of the Prior Art

It is known to provide malware scanners that examine computer files to determine whether they contain malware, such as computer viruses, worms, Trojans, banned files, banned words, banned images, etc. The damage that can be caused to a computer system or computer network by malware is significant and accordingly the use of such malware scanners is highly desirable. However, as the number of different items of malware that need to be scanned for rapidly increases, the processing resources associated with malware scanning also rapidly increase. This introduces a significant disadvantageous processing load on the computer systems and networks concerned. As an example, on-access scanning of computer files is a technique whereby every access request to a computer file results in malware scanning of that computer file before that request is serviced. Whilst this is a secure operational technique, it does disadvantageously slow down the processing speed and responsiveness of a computer system.

It is known to provide malware scanners that maintain a cache identifying all the computer files that have been recently malware scanned. When a computer file access request is made, a check in the cache is conducted to determine whether that particular computer file has been malware scanned, found to be clean and is unchanged since it was last malware scanned. If the file has already been malware scanned, found to be clean and is unchanged since it was found to be clean, then the file access may be allowed without further malware scanning being required. This approach whilst avoiding unnecessary repeated scanning, does suffer from the disadvantage that significant resources, such as working memory, need to be devoted to storing what can become a very large list of already scanned computer files. If the memory resources devoted to caching is reduced, then this reduces the effectiveness of the technique since the cache may not have sufficient capacity to store details of a sufficient number of all the computer files that have been already scanned so resulting in a need to unnecessarily re-scan some computer files.

It is also known to provide e-mail systems in which the database of stored e-mail messages pre-emptively scanned for malware and if no malware is found classified as being malware-free.

Measures which can maintain security against malware whilst reducing the consumed processing resources and/or the impact upon system responsiveness are strongly desirable.

SUMMARY OF THE INVENTION

Viewed from one aspect the present invention provides a computer program product for controlling a computer to scan computer files for malware, said computer program product comprising:

malware scanning code operable to malware scan all computer files stored within a storage location as addressed by an operating system to identify any computer files stored within said storage location that contain malware;

identification code operable if no computer files containing malware are found in said storage location, to identify said storage location as a clean storage location; and when subsequently reading a computer file, determination code operable to determine whether or not said computer file is stored within a clean storage location and:

if said computer file is stored within a clean storage location, then permitting reading of said computer file without further malware scanning; and if said computer file is not stored within a clean storage location, then malware scanning said computer file.

The invention recognises that large numbers of computer file access requests are made to certain storage locations which can contain computer files that change relatively infrequently. A significant net gain may be made by pre-emptively malware scanning all of the computer files within a particular storage location and if clean then merely recording that any computer files in that storage location are malware-free and so do not require malware scanning before being accessed. The memory resources consumed by merely storing the identification of a storage location rather than the identification of every file in that storage location are considerably reduced. The invention also exploits the fact that the way computer files are stored and organised into storage locations, such as directories on a disk, tends to associate together computer files sharing the same or similar characteristics within the same storage locations. Accordingly, operating system computer files and application program computer files will tend to be concentrated together in their own directories. These computer files tend to be large in number and frequently accessed and yet changed very little. Conversely, a user's application data will tend for convenience to be concentrated together in another directory, (e.g. a My Documents directory) and will be relatively rapidly changing although only a few computer files will be accessed in a given time. Thus, the storage locations (directories) storing the large numbers of frequently accessed but infrequently changing computer files can be pre-emptively scanned and marked together as clean in a manner that avoids unnecessary rescanning for malware and yet consumes comparatively little memory resources. Computer files not within such clean storage locations would be malware scanned when being read.

The effectiveness of this technique is improved when the storage locations to be scanned and classified as clean are user selectable. Thus, a system user or network administrator may specify the particular directories and subdirectories as controlled by the operating system which they wish to be subject to this pre-emptive scanning and classification as being malware-free. It is also possible envisage systems in which the storage locations to be pre-emptively scanned were automatically selected, such as by examining the access and change statistics associated with different computer files in different storage locations.

The invention is particularly useful in embodiments in which the scanning of all computer files stored within a storage location is performed as a background task. This feature recognises that a typical computer system spends a significant proportion of its time idling when a user is not seeking to perform any operations with it. This time and processing capacity may be applied to the pre-emptive malware scanning. Accordingly, when the user does start to use the computer system, the pre-emptive scanning will not interfere with the responsiveness at that point and if it has resulted in certain storage locations being indicated as malware-free in their entirety, then it will speed up responsiveness since computer file reads to those locations will not require re-scanning.

Whilst the on-access and pre-emptive scanning may scan in the same way, preferred embodiments of the invention utilise more stringent scanning for the pre-emptive background scanning compared with the on-access scanning. Since the pre-emptive scanning is arranged as a background task, it will not interfere with the user responsiveness of the system and accordingly using more stringent scanning criteria will increase security whilst having little impact on the user.

It will be appreciated that whilst some storage locations are relatively infrequently written to, it may be inefficient merely to reclassify them as a whole as no longer being guaranteed malware-free if a single write occurs to those storage locations. Accordingly, in preferred embodiments of the invention computer files being written to a clean storage location are malware scanned before they are written such that the malware-free status of that storage location may be maintained.

In order to preserve the security the malware scanning of storage locations to classify them as clean will preferably be repeated whenever the system is rebooted as it is not possible to guarantee the files have been unchanged between reboots. This is less of a disadvantage than it might first appear due to the increased reliability of modem operating systems and widespread practice to leave many computer systems running for several weeks at the time.

It will be appreciated by those familiar with the field that malware scanning security is improved by the regular updating of malware definition data used to identify malware. Typically, when a new item of malware is encountered the malware definition data is updated so as to include information to enable this new item of malware to be identified. It is often the case that the new item of malware is one that poses a relatively high risk since many systems will be unprotected against it and it may rapidly propagate.

Preferred embodiments of the invention recognise this and operate to rescan all the storage locations should updated malware definition data be obtained.

Particularly preferred embodiments take this recognition further by prioritising the computer files being rescanned to scan first those that have been written since the storage location was previously classified as clean. This recognises that such newly written computer files are statistically more likely be infected with the newly released malware which the updated malware definition data is seeking to catch.

It will be appreciated that the malware being scanned for can take a wide variety of different forms. In particular, the malware being scanned for may include one or more of a computer virus, a worm, a Trojan, a banned computer file, a banned word and a banned image.

Other aspects of this invention also provide a method of scanning computer files for malware and an apparatus for scanning computer files for malware in line with the above described techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
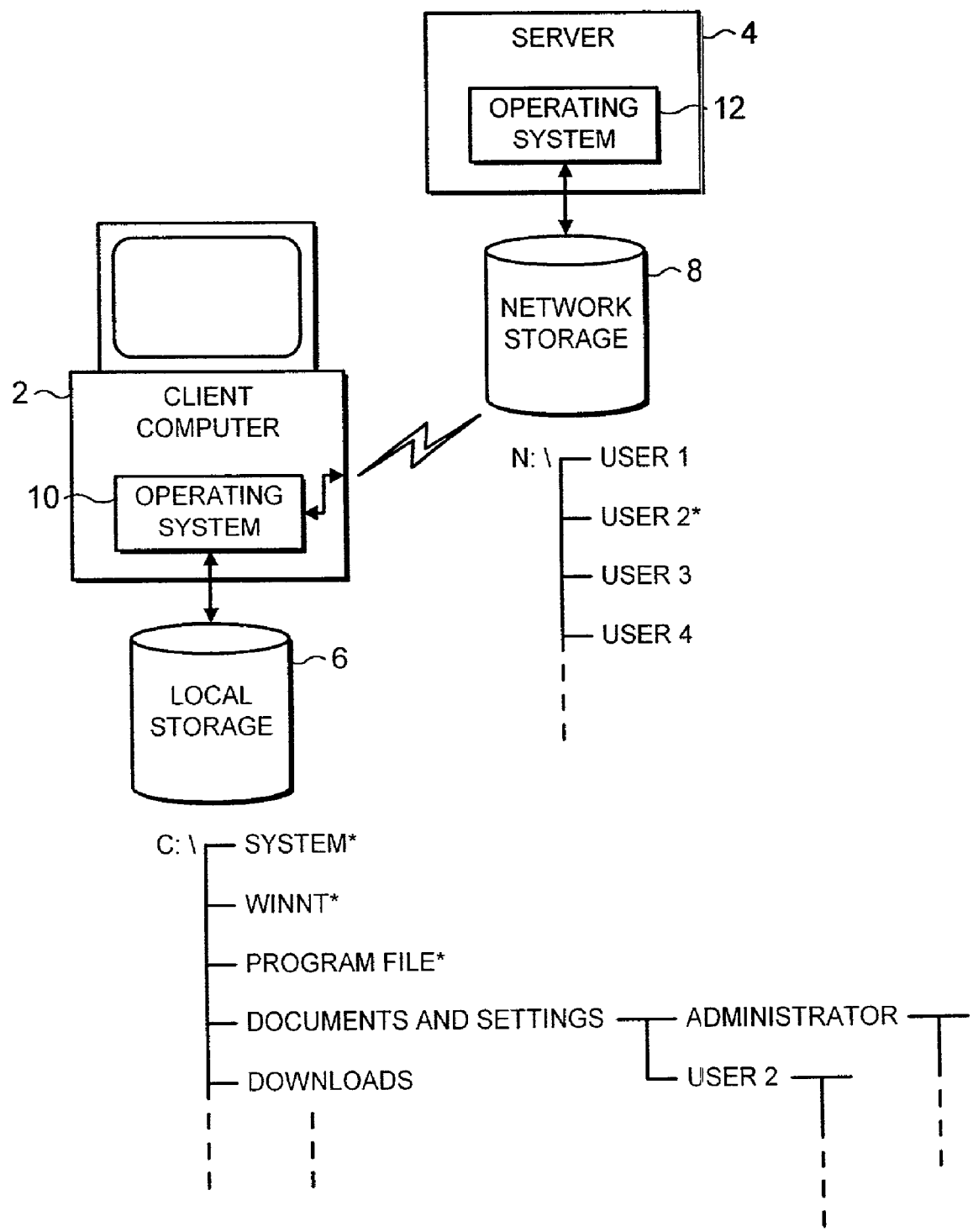
FIG. 1 schematically illustrates storage locations accessible to a client computer and a network.

FIG. 1 Illustrates a client computer 2 and a server computer 4. The client computer 2 has associated local storage 6 that may comprise the local hard disk drive of the client computer 2. Similarly, the server 4 has a network storage device 8 that may be the network disk drive. Each of the client computer 2 and the server 4 includes a respective operating system 10, 12 that serves to organise and control access to computer files stored in the local storage 6 and the network storage 8.

As illustrated, from a users point of view the computer files concerned are arranged by the operating system 10, 12 within a logical drive, directory and sub-directory structure. This allows the computer files to be logically collected together and organised in a manner that makes manipulating and finding those computer files easier. As an example, the local storage device 6 and operating system 10 may organise the storage of computer files such that the operating system computer files and the application program computer files are grouped together within their own directories and sub-directories. These directories and sub-directories may be separate from the directories that store a user's application data and data such as downloads. In a similar way, the network storage device 8 and the associated operating system 12 may store different user's computer files in different directories in a manner that makes it easier to attribute "ownership" of a particular computer file to a particular user. The existing arrangement of computer files in such a directory structure whereby files sharing common characteristics and uses tend to be grouped together facilitates the present technique by making it easier to identify particular directories that may be pre-emptively malware scanned to good effect. In the example illustrated in the FIG. 1, those directories marked with an "*" are selected to be pre-emptively scanned. On the client computer 2, the operating system directories and the application program file directories contain a large number of files that are frequently accessed and yet infrequently changed. Thus, they may be advantageously pre-emptively scanned and certified on mass as malware-free so avoiding the need to re-scan computer files within those directories when they are subsequently accessed. On the server computer 4, a particular user may store data that also shares these characteristics. Thus, that particular directory may also be pre-emptively scanned to good effect.

It will be appreciated that the storage locations being pre-emptively scanned and classified as clean storage locations are storage locations as addressed by the operating system. It will be appreciated that the individual computer files, and indeed different portions of the same computer file, may be physically spread over different physical locations on a data storage device, such as a disk drive, but nevertheless share a common logical storage location as viewed by the operating system. The grouping together of computer files sharing similar characteristics is done at the logical level by the operating system and it is this which is exploited by the present technique.

Figure 2:
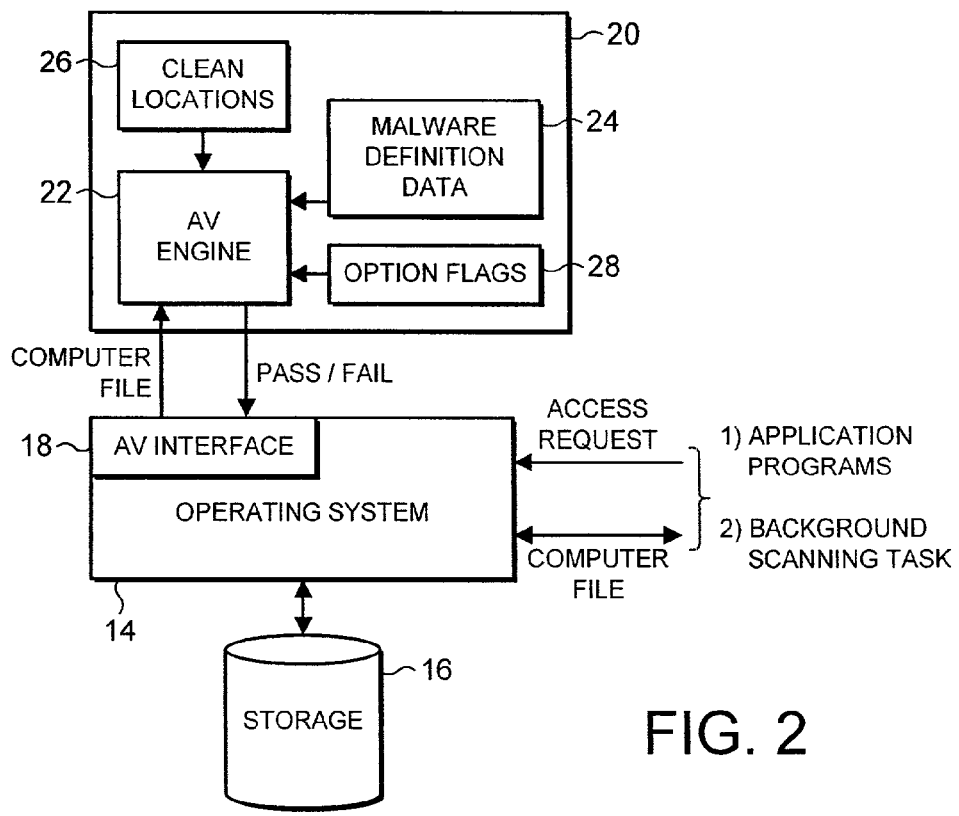
FIG. 2 schematically illustrates a malware scanner.

FIG. 2 illustrates a malware scanner in more detail. An operating system 14 receives access requests from application programs and the background scanning task. If the malware scanner indicates that the computer file is malware-free, then the computer file to be accessed is either returned or written to via the operating system 14. The operating system 14 is responsible for the low level communication with the physical storage device 16.

An anti-virus interface 18 within the operating system 14 serves to intercept access requests received and redirect these to the malware scanner 20. The computer file concerned is passed to the malware scanner where an anti-virus engine 22 serves to use malware definition data 24 to examine the computer file concerned to see if it contains any malware as identified within the malware definition data. In the present technique, a store 26 of data identifying known clean storage locations is maintained and provided to the anti-virus engine 22. When the anti-virus engine 22 receives a computer file to scan, it checks whether that computer file is stored in within a known clean location and if it is stored in a known clean location it will return a pass result without spending time conducting the malware scanning. Conversely, if the file is not within a known clean location, then the malware scanning will be performed.

Data 28 defining option flags is also provided within the malware scanner 20 and serves to define parameters controlling the thoroughness of the malware scanning performed depending upon whether the malware scan is an on-access malware scan requested by an application program or a malware scan being requested by the background scanning task, for which generally more stringent and secure scanning options will be selected, such as scanning all files and turning on heuristic scanning.

Figure 3:
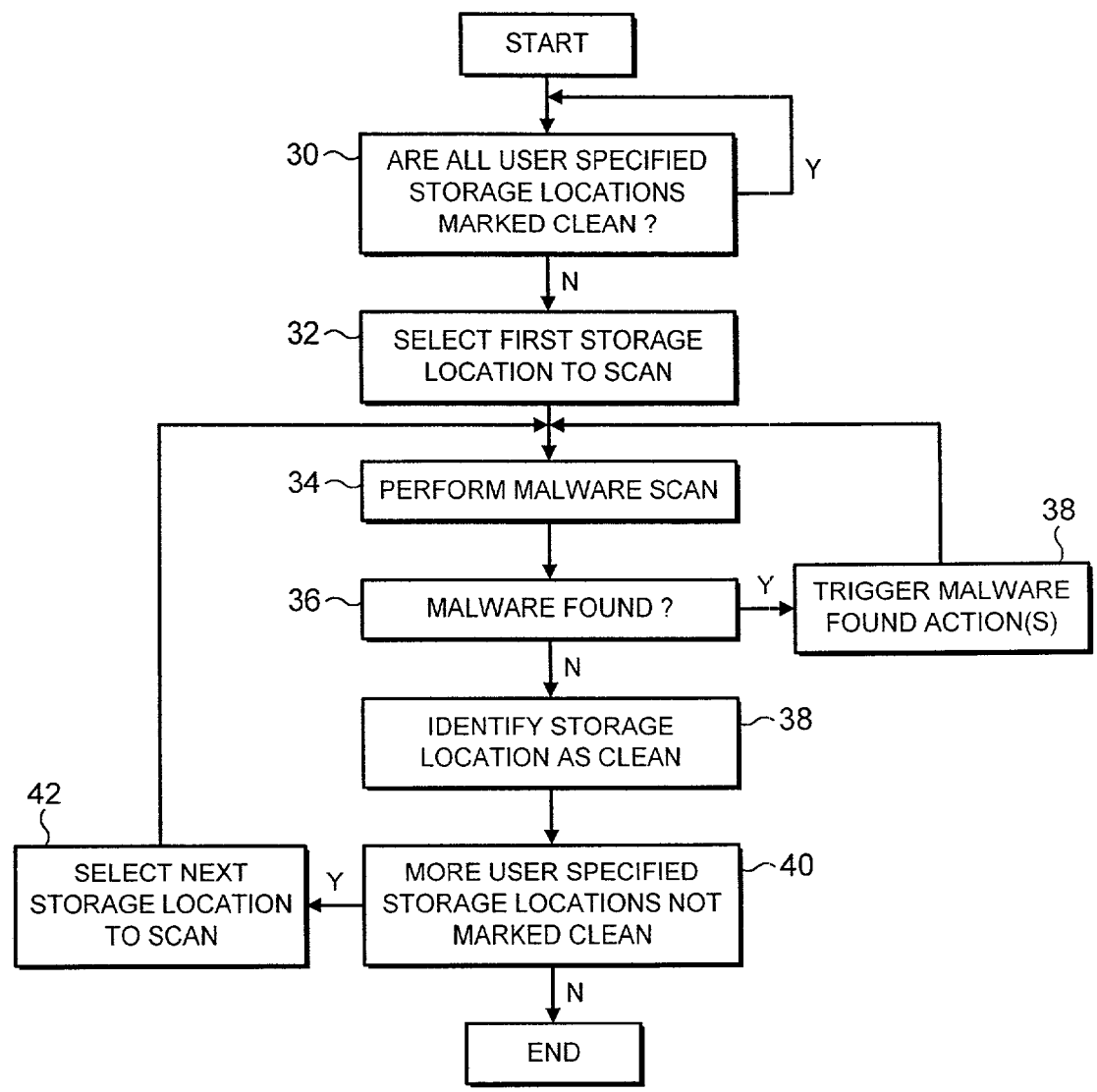
FIG. 3 is a flow diagram schematically illustrating the pre-emptive scanning of storage locations.

FIG. 3 is a flow diagram schematically illustrating the pre-emptive scanning of storage locations. At step 30 a determination is made as to whether or not all the storage locations that have been specified by a user have been pre-emptively scanned and marked as clean. The storage locations that are the targets for pre-emptive scanning may be defined within the store 26 that also stores the clean status of such storage locations. If there are user specified locations that have yet to be marked as clean, then step 32 selects the first of these prior to performing a full and stringent malware scan at step 34. This malware scan will typically be performed as a background task using parameters associated with the task as are provided by operating systems for prioritising tasks and are familiar to application programmers.

At step 36 a determination is made as to whether or not any malware has been found. If malware has been found, then step 38 serves to trigger a malware found action, such as disinfecting of the computer file concerned, deletion of the computer file concerned, issuing alert messages to a user or system administrator, quarantining of the computer file concerned or other actions. Processing then returns to step 34 for the storage location concerned until a malware free status is found.

If the test at step 36 did not found any malware, then step 38 serves to identify and classify the storage location just scanned as clean and this is recorded within the store 26 held by the malware scanner 20. At step 40 a test is made as to whether or not there are more users specified storage locations that have not yet been marked as clean. If there are such locations, then step 42 selects the next of them prior to returning processing to step 34. If all the user specified locations have been marked as clean then processing terminates.

Figure 4:
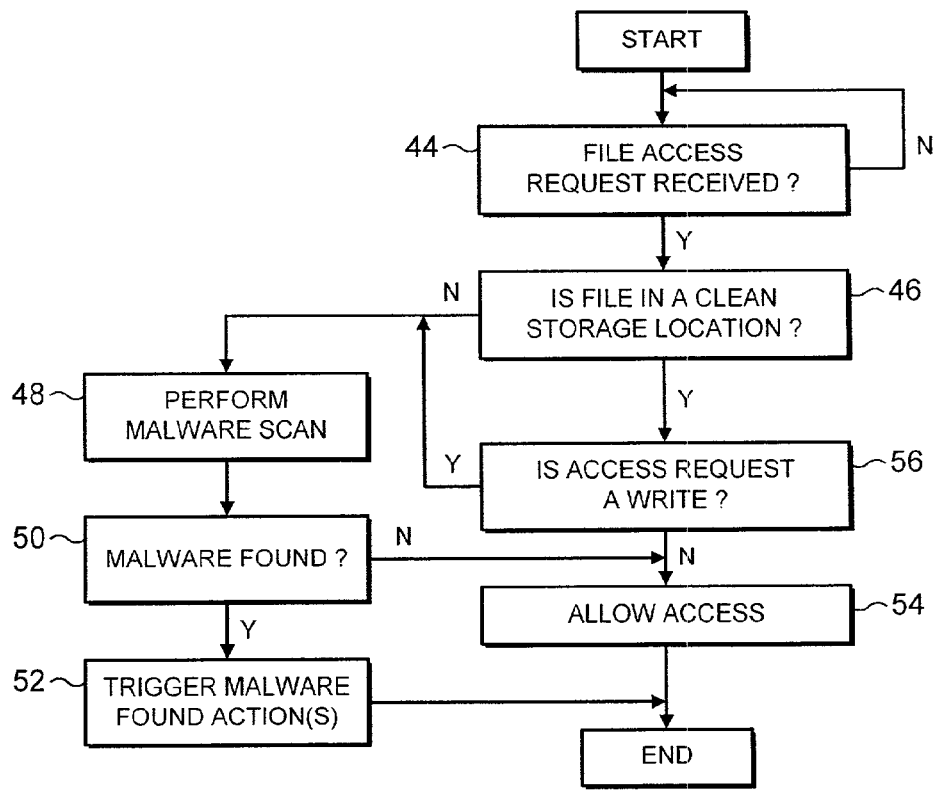
FIG. 4 is a flow diagram schematically illustrating the servicing of a file access request.

FIG. 4 is a flow diagram schematically illustrating the servicing of a file access request. At step 44 the system waits for a file access request to be received. When a file access request is received, processing proceeds to step 46 at which a determination is made as to whether or not the file access request relates to a file stored within a clean storage location as defined within the store 26 held by the malware scanner 20. If the file is not held within a clean storage location, then processing proceeds to step 48 at which a malware scan is performed. The data 28 defining the scanning options within the malware scanner 20 will typically apply a less stringent, but more rapid malware scan to such an on-access request. At step 50, subsequent to the malware scan, a determination is made as to whether any malware has been found. If malware has been found, then a malware found action is triggered at step 52 in a similar way to step 38 of FIG. 3. After the malware found action, processing terminates. If malware is not found at step 50, then processing proceeds to step 54 at which access to the file is allowed.

If the determination at step 46 was that the file access request was to a file stored within a clean storage location, then step 56 determines whether or not the file access request is a write request. If the file access request is a write request, then processing proceeds to step 48 at which the malware scan is performed irrespective of the fact that the computer file is being written to a clean storage location. It will be appreciated that since the file is being written to the clean storage location it needs scanning since its status is not confirmed by any scanning that was conducted upon a previous version of that computer file and the new version of that computer file should be malware scanned if the storage location in which it is to be stored is to maintain its classification as a clean storage location.

If the test at step 56 indicated that the file access request was not a write, then the access will be allowed at step 54. It will be appreciated that a large number of file access requests are read requests and will take place to known clean storage locations. Such file access requests will proceed via steps 46, 56 and 54 to allow the access request without the relatively slow step 48 which performs the malware scan being required.

Figure 5:
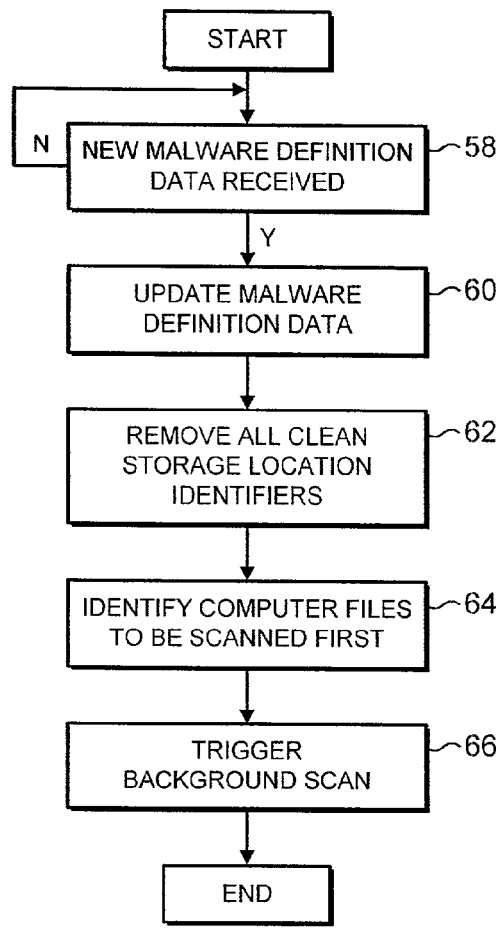
FIG. 5 is a flow diagram schematically illustrating processing upon receipt of updated malware definition data.

FIG. 5 is a flow diagram schematically illustrating processing performed to update malware definition data. At step 58 the system waits to see if the malware definition data 24 is being updated with new malware definition data 24. Such new malware definition data 24 may be downloaded via the internet or read from a media. When such new malware definition data 24 is received, it is used to update the old version within the malware scanner 20 at step 60. After step 60, step 62 serves to revoke the clean status associated with all storage locations that had previously been classified as clean and records this within store 26. Since the updated malware definition data 24 will detect more types of malware than the old version, it is necessary to re-scan all the storage locations to ensure that they do not include any of the extra malware that is now being detected before they are re-classified as clean.

At step 64 those computer files that have been written since the storage locations concerned were previously scanned and classified as clean are identified. This identification may be made by using the file attributes typically held within the operating system for each computer file (e.g. date and time of creation) in comparison with a record of the times at which different malware definition data updates were made. It is advantageous to scan the most recently written computer files first as these are the ones that are most likely to be infected with the newly released malware which the updated malware definition data is trying to catch.

Step 64 triggers a background scan of the user defined storage locations that are to be pre-emptively scanned using the technique illustrated in FIG. 3.

Figure 6:
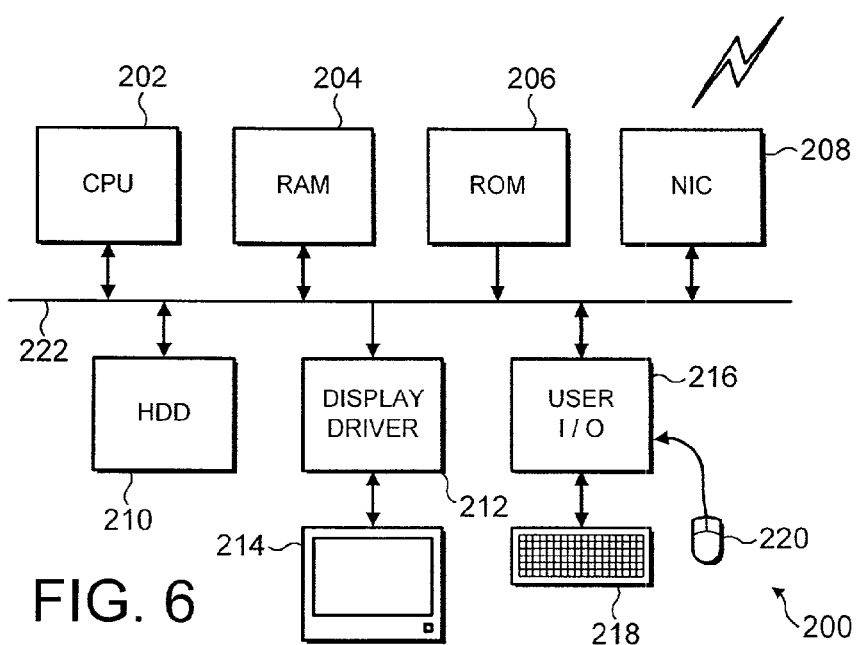
FIG. 6 is a diagram schematically illustrating the architecture of a general purpose computer that may be used to implement the above described techniques.

FIG. 6 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a tangible computer-readable medium for controlling a computer to scan computer files for malware, said computer program product comprising:

malware scanning code operable to malware scan all computer files stored within a storage location as addressed by an operating system to identify any computer files stored within said storage location that contain malware;

identification code operable if no computer files containing malware are found in said storage location, to identify said storage location as a clean storage location; and when subsequently reading a computer file, determination code operable to determine whether or not said computer file is stored within a clean storage location and:

if said computer file is stored within a clean storage location, then permitting reading of said computer file without further malware scanning; and if said computer file is not stored within a clean storage location, then malware scanning said computer file;

wherein said malware scanning of all computer files stored within a storage location is performed as a background task that occurs as a function of when an associated computer system is idle;

wherein said malware scanning of all computer files stored within a storage location as a background task is performed with more thorough scanning options selected than for on-access scanning applied to computer files not stored within clean storage locations and being accessed by a user;

wherein said malware scanning code uses malware definition data to identify malware and, upon updating of said malware definition data to give updated malware definition data, said storage location is no longer identified as a clean storage area until it has been malware scanned using said updated malware definition data and no computer files containing malware are found in said storage location.

2. A computer program product as claimed in claim 1, wherein said malware scanning of all computer files stored within a storage location is performed upon a set of user specified storage locations from within all storage locations accessible to a user.

3. A computer program product as claimed in claim 1, wherein a computer file is malware scanned before being written to a clean storage location.

4. A computer program product as claimed in claim 1, wherein, when said storage area is being malware scanned with said updated malware definition data, computer files written to said storage location after said storage location was previously identified as a clean storage location are malware scanned before computer files that are unaltered since said storage location was previously identified as a clean storage location.

5. A computer program product as claimed in claim 1, wherein said malware is one or more of a computer virus, a worm, a Trojan, a banned computer file, a banned word and a banned image.

6. A computer program product as claimed in claim 1, wherein, if said computer file is stored within said clean storage location, then said computer file is permitted to be read without further time spent on malware-related processing.

7. A computer program product as claimed in claim 1, wherein said malware scanning using said updated malware definition data is performed as another background task.

8. A computer program product as claimed in claim 1, wherein the background task avoids interference with a responsiveness of the associated computer system when the user starts to use the computer system.

9. A method of scanning computer files for malware, said method comprising:

malware scanning all computer files stored within a storage location as addressed by an operating system to identify any computer files stored within said storage location that contain malware;

if no computer files containing malware are found in said storage location, then identifying said storage location as a clean storage location; and when subsequently reading a computer file, determining whether or not said computer file is stored within a clean storage location, whereupon:

if said computer file is stored within a clean storage location then permitting reading of said computer file without further malware scanning; and if said computer file is not stored within a clean storage location, then malware scanning said computer file;

wherein said malware scanning all computer files stored within a storage location is performed as a background task that occurs as a function of when an associated computer system is, at least in part, idle;

wherein said malware scanning all computer files stored within a storage location as a background task is performed with more scanning options selected than for on-access scanning applied to computer files not stored within clean storage locations and being accessed by a user;

wherein said malware scanning uses malware definition data to identify malware and, upon updating of said malware definition data to give updated malware definition data, said storage location is no longer identified as a clean storage area until it has been malware scanned using said updated malware definition data and no computer files containing malware are found in said storage location.

10. A method as claimed in claim 9, wherein malware scanning all computer files stored within a storage location is performed upon a set of user specified storage locations from within all storage locations accessible to a user.

11. A method as claimed in claim 9, wherein a computer file is malware scanned before being written to a clean storage location.

12. A method as claimed in claim 9, wherein, when said storage area is being malware scanned with said updated malware definition data, computer files written to said storage location after said storage location was previously identified as a clean storage location are malware scanned before computer files that are unaltered since said storage location was previously identified as a clean storage location.

13. A method as claimed in claim 9, wherein said malware is one or more of a computer virus, a worm, a Trojan, a banned computer file, a banned word and a banned image.

14. Apparatus including a tangible computer readable medium for scanning computer files for malware, said apparatus comprising:

malware scanning logic operable to malware scan all computer files stored within a storage location as addressed by an operating system to identify any computer files stored within said storage location that contain malware;

identification logic operable if no computer files containing malware are found in said storage location, to identify said storage location as a clean storage location; and when subsequently reading a computer file, determination logic operable to determine whether or not said computer file is stored within a clean storage location and;

if said computer file is stored within a clean storage location, then permitting reading, of said computer file without further malware scanning; and if said computer file is not stored within a clean storage location, then malware scanning said computer file;

wherein said malware scanning of all computer files stored within a storage location is performed as a background task that occurs as a function of when an associated computer system is idle;

wherein said malware scanning of all computer files stored within a storage location as a background task is performed with more scanning options selected than for on-access scanning applied to computer files not stored within clean storage locations and being accessed by a user;

wherein said malware scanning logic uses malware definition data to identity malware and, upon updating of said malware definition data to give updated malware definition data, said storage location is no longer identified as a clean storage area until it has been malware scanned using said updated malware definition data and no computer files containing malware are found in said storage location.

15. Apparatus as claimed in claim 14, wherein said malware scanning of all computer files stored within a storage location is performed upon a set of user specified storage locations from within all storage locations accessible to a user.

16. Apparatus as claimed in claim 14, wherein a computer file is malware scanned before being written to a clean storage location.

17. Apparatus as claimed in claim 14, wherein, when said storage area is being malware scanned with said updated malware definition data, computer files written to said storage location after said storage location was previously identified as a clean storage location are malware scanned before computer files that are unaltered since said storage location was previously identified as a clean storage location.

18. Apparatus as claimed in claim 14, wherein said malware is one or more of a computer virus, a worm, a Trojan, a banned computer file, a banned word and a banned image.

19. A computer program product embodied on a tangible computer readable medium for controlling a computer to scan computer files for malware, said computer program product comprising:

malware scanning code operable to malware scan all computer files stored within a storage location as addressed by an operating system to identify any computer files stored within said storage location that contain malware;

identification code operable if no computer files containing malware are found in said storage location, to identify said storage location as a clean storage location; and when subsequently reading a computer file, determination code operable to determine whether or not said computer file is stored within a clean storage location and;

if said computer file is stored within a clean storage location then permitting reading of said computer file without further malware scanning; and if said computer file is not stored within a clean storage location, then malware scanning said computer file;

wherein said malware scanning of all computer files stored within a storage location is performed as a background task that occurs as a function of when an associated computer system is at least in part, idle;

wherein said malware scanning of all computer files stored within a storage location as background task is performed with more scanning options selected than for on-access scanning applied to computer files not stored within clean storage locations and being accessed by a user;

wherein all of said computer files stored within said storage location addressed by said operating system share a common logical storage location as viewed by said operating system such that said logical storage location includes computer files sharing similar characteristics.

* * * * *

UNITED STATES PATENT AND TRADEMARK OFFICE
CERTIFICATE OF CORRECTION

PATENT NO. : 7,266,843 B2 Page 1 of 1
APPLICATION NO. : 10/025572
DATED : September 4, 2007
INVENTOR(S) : Tarbotton et al.

It is certified that error appears in the above-identified patent and that said Letters Patent is hereby corrected as shown below:

In the claims:
col. 9, line 66 replace "identity" with --identify--;
col. 10, line 42 replace "and;" with --and:--;
col. 10, line 44 replace "location" with --location,--;
col. 10, line 51 replace "is" with --is,--;
col. 10, line 53 insert --a-- before "background" and after "as".

Signed and Sealed this

Second Day of February, 2010

David J. Kappos
*Director of the United States Patent and Trademark Office*